US009574734B2

(12) United States Patent
Sousek et al.

(10) Patent No.: US 9,574,734 B2
(45) Date of Patent: Feb. 21, 2017

(54) LIGHTGUIDE MODULE

(75) Inventors: Pavel Sousek, Novi Jicin (CZ); Jan Martoch, Hranice (CZ); Wilfred Dejmek, Frydek-Mistek (CZ)

(73) Assignee: VARROC LIGHTING SYSTEMS S.R.O. (CZ)

( * ) Notice: Subject to any disclaimer, the term of this patent is extended or adjusted under 35 U.S.C. 154(b) by 0 days.

(21) Appl. No.: 13/198,999

(22) Filed: Aug. 5, 2011

(65) Prior Publication Data

US 2012/0033441 A1 Feb. 9, 2012

(30) Foreign Application Priority Data

Aug. 6, 2010 (CZ) .............................. PV 2010-602

(51) Int. Cl.
*F21V 7/04* (2006.01)
*G02B 6/00* (2006.01)
*G09F 13/00* (2006.01)
*F21S 8/10* (2006.01)

(52) U.S. Cl.
CPC .......... *F21S 48/215* (2013.01); *F21S 48/2243* (2013.01); *F21S 48/2262* (2013.01); *F21S 48/2281* (2013.01)

(58) Field of Classification Search
CPC ... F21V 5/04; G02B 19/0014; G02B 19/0071; F21S 48/215; F21S 48/2243; F21S 48/2262; F21S 48/2281
USPC ................ 362/555, 551, 545, 511, 543, 558, 606,362/608
See application file for complete search history.

(56) References Cited

U.S. PATENT DOCUMENTS

| | | | | |
|---|---|---|---|---|
| 6,502,964 | B1 | 1/2003 | Simon | |
| 6,527,411 | B1 * | 3/2003 | Sayers | 362/245 |
| 6,547,423 | B2 * | 4/2003 | Marshall et al. | 362/333 |
| 6,637,924 | B2 * | 10/2003 | Pelka et al. | 362/555 |
| 6,783,268 | B2 * | 8/2004 | Aynie et al. | 362/544 |
| 6,974,236 | B2 * | 12/2005 | Tenmyo | F21V 5/045 362/327 |
| 7,008,097 | B1 * | 3/2006 | Hulse | 362/546 |
| 7,128,431 | B2 * | 10/2006 | Ludewig et al. | 362/26 |
| 7,300,185 | B1 * | 11/2007 | Ruffin et al. | 362/347 |
| 7,652,300 | B2 * | 1/2010 | Kan | 257/98 |
| 7,837,350 | B2 * | 11/2010 | Tsao et al. | 362/246 |
| 7,942,565 | B2 * | 5/2011 | Klick et al. | 362/610 |
| 2003/0085642 | A1 * | 5/2003 | Pelka et al. | 313/113 |

(Continued)

FOREIGN PATENT DOCUMENTS

| | | | |
|---|---|---|---|
| DE | 10346452 | A1 | 4/2005 |
| DE | 102009000768 | A1 | 10/2009 |

(Continued)

*Primary Examiner* — Peggy Neils
*Assistant Examiner* — Tsion Tumebo
(74) *Attorney, Agent, or Firm* — Cantor Colburn LLP

(57) ABSTRACT

A lightguide module having a linear collimator produced from optically transparent material, a toroidal lens produced from optically transparent material, and a light source, wherein the toroidal lens is disposed between the linear collimator and the light source, at the exit of the linear collimator are found scattering elements, and wherein a light-emitting part of the light source is directed toward an entry surface of the toroidal lens and an exit surface of the toroidal lens is directed toward entry surfaces of the linear collimator. The light source may be a light-emitting diode and the toroidal lens may be a Fresnel type lens.

5 Claims, 12 Drawing Sheets

(56) References Cited

U.S. PATENT DOCUMENTS

| | | | | |
|---|---|---|---|---|
| 2005/0065798 | A1 | 3/2005 | Kunstler | |
| 2006/0139580 | A1* | 6/2006 | Conner | G02B 27/0994 353/98 |
| 2007/0019429 | A1* | 1/2007 | Gasquet | 362/510 |
| 2007/0176187 | A1* | 8/2007 | Iwanaga | 257/79 |
| 2008/0055928 | A1 | 3/2008 | Arai | |
| 2008/0310166 | A1* | 12/2008 | Chinniah et al. | 362/268 |
| 2009/0262517 | A1* | 10/2009 | Suehiro et al. | 362/84 |
| 2010/0142221 | A1* | 6/2010 | Yao et al. | 362/612 |
| 2011/0273862 | A1* | 11/2011 | Li et al. | 362/19 |

FOREIGN PATENT DOCUMENTS

| | | | |
|---|---|---|---|
| DE | 102008048764 | A1 | 3/2010 |
| DE | 102008048765 | A1 | 3/2010 |
| EP | 1895228 | A1 | 3/2008 |

* cited by examiner (PRIOR ART)

LIGHTGUIDE MODULE

CROSS-REFERENCE TO RELATED APPLICATION

The present application claims priority to Czech Republic Patent Application Serial No. PV 2010-602 filed Aug. 6, 2010, the entire disclosure of which is hereby incorporated herein by reference.

FIELD OF INVENTION

The invention concerns a design of a lightguide module for rear and front signal lights, the back-up light of motor vehicles, and the like.

BACKGROUND OF THE INVENTION

Signal lights contain various kinds of optical systems which collimate a light beam emitted by a light source and then distribute the light in a direction required by international regulations. Among the widely used collimation techniques is collimation by means of a parabolic reflector, collimation by means of a converging lens and collimation by means of a Fresnel type converging lens. Recently, in connection with the use of light-emitting diodes (LEDs), a rotational collimator has also been used for the collimation of light, in which the light beam is collimated by a central entry surface created by a converging lens and outermost entry surfaces working on the principle of total reflection of light. Rotational collimators are part of optical modules which contain, besides the mentioned collimator, also scattering elements necessary for the distribution of the collimated light beam in the directions required by international regulations. Rotational collimators are used in combination with light-emitting diodes, which have a broad radiation characteristic.

In order to achieve the required efficiency needed to achieve the luminous intensity values as required by international regulations, it is necessary for the body of the rotational collimator to have a greater thickness (much greater than 2-3 mm, which is the standard thickness for plastic moldings used in light engineering for automobiles). The greater thickness of the collimator consequently leads to a high price of the molding, a high price of the mold, and also manufacturing problems that are connected with the making of thick-wall plastic moldings. When it is necessary for production reasons to reduce the thickness of the molding, this is achieved by removing part of the collimation surface of the collimator, which necessarily leads to lower efficiency of the optical module.

For a use in signal lights, it is advisable for design and production reasons that the dimension of the collimator is substantially larger in one direction than in another direction perpendicular to it.

SUMMARY OF THE INVENTION

The aim of the invention of a lightguide module is: to achieve luminous intensity values by required international regulations for signal functions on front and rear signal lights, to use light sources with broad radiation characteristic, to use plastic parts whose thickness will be substantially less than the thickness of plastic parts that contain a complete rotational collimator, and to achieve a solid and homogeneous light exit surface.

The above indicated aims are accomplished by a lightguide module consisting of a linear collimator, made from optically transparent material, a toroidal lens, made from optically transparent material, and a light source, according to this invention, the essence of which lies in that the toroidal lens is placed between the linear collimator of plate form, at the exit of which are found scattering elements, and the light source, while the light-emitting part of the light source is turned toward the entry surface of the toroidal lens and the exit surface of the toroidal lens is turned toward the entry surfaces of the linear collimator.

Moreover, the essence of the lightguide module is that the light source is a light-emitting diode, and that the toroidal lens is a Fresnel type lens, which is part of the light source.

In an advantageous embodiment, the linear collimator and the toroidal lens form a single part.

It is also desirable that the lightguide module contains at least one additional toroidal lens and at least one additional linear collimator, while the toroidal lenses together form a single part and the linear collimators together form another single part (5).

In an advantageous embodiment, two or more toroidal lenses and two or more linear collimators together form a single common part.

Finally, it is desirable for the lightguide module of this invention that the scattering elements of the linear collimator are arranged either at the exit surface of the linear collimator or on an additional optical plate, and are configured as optical elements of convex or concave shape.

In the lightguide module that is the subject of this invention, the light emerging from the source is first collimated by the toroidal lens and then by the linear collimator. Thanks to the combination of these two parts, it is possible to substantially reduce the thickness of the collimator to a value in the range of 5 to 6 mm. The linear collimator of substantially plate form is made of optically transparent material. The toroidal lens is also made from optically transparent material. Contemporary concepts of signal lights that use collimators for the collimation of light do not contain a collimating toroidal lens.

There are optical scattering elements at the exit surface of the linear collimator, which scatter the collimated light, provide a distribution of light in the directions required by international regulations, and also serve to achieve a solid and homogeneous light exit surface. These scattering elements form a luminous surface. The optical module is placed in the signal lights or projection lamps in the space bounded by the body and the cover glass.

The lightguide module that is the subject of the invention can be used broadly for individual signal functions in signal lights and projection lamps. The signal function can be created by a single lightguide module or by several of these modules, depending on the desired shape and size of the exit surface, the value of the light flux of the light sources used, or the number of light sources used. With the lightguide modules, attractive shapes of signal functions can be achieved.

A light-emitting diode is acceptable for use as the light source. This has a short reaction time, long lifetime, and can achieve different shapes of luminous exit surfaces.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
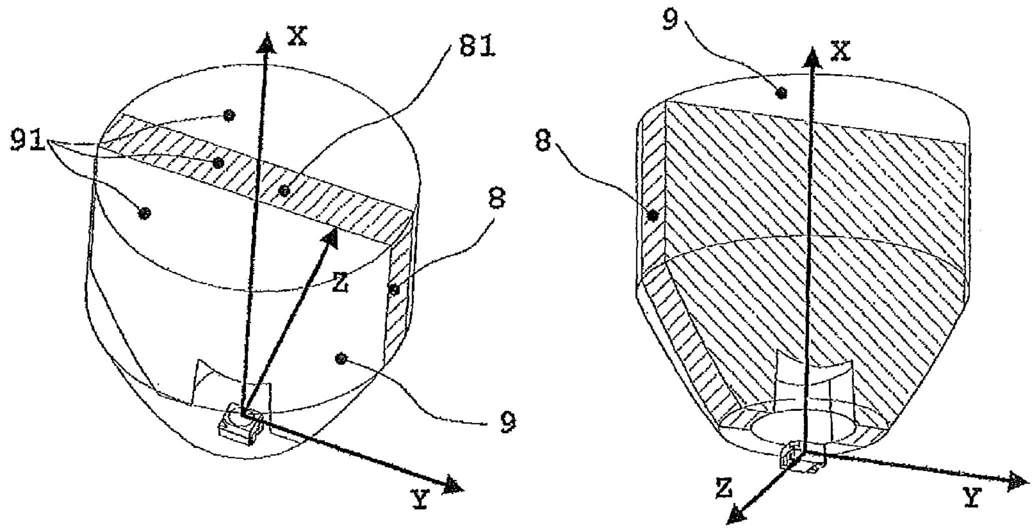
FIG. 1 shows two isometric views of the known rotational collimators.

Familiar rotational collimators 8, 9 are shown in FIG. 1 for clarity and better understanding of the essence of the newly proposed design. Exit surfaces 81, 91 of the collimators 8, 9 are also shown.

Figure 2A:
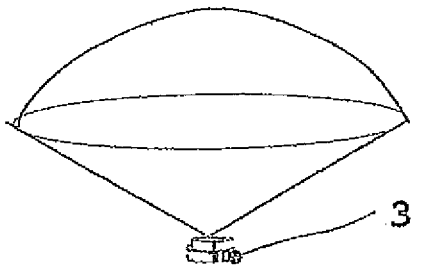
FIGS. 2*a*, 2*b*, 2*c* shows perspective views of the light source, a beveled rotational collimator, and a combination of linear collimator and toroidal lens.
Figure 2B:
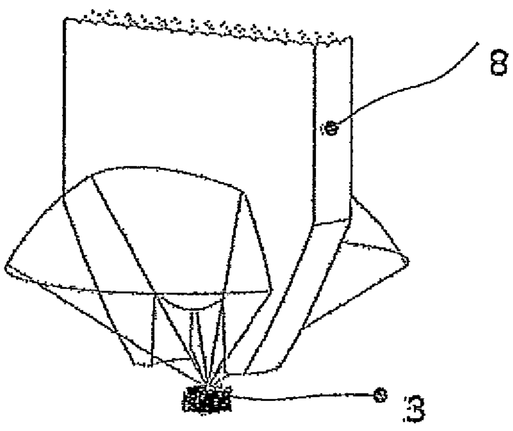
Figure 2C:
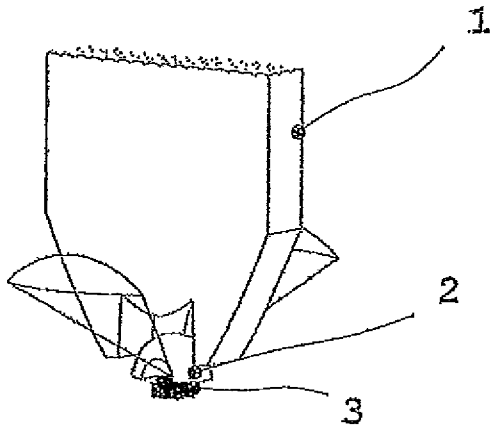

The difference in efficiency when using a rotational collimator and the lightguide module which is the subject of the invention is shown in FIGS. 2*a*, 2*b*, 2*c*. A light source 3 emits light in a conical sector. FIG. 2*a* shows the light source 3 and the cone of light emerging from the light source 3. FIG. 2*b* shows the light source 3, a beveled rotational collimator 8 and the part of the cone of light emerging from the light source 3 that was not collimated by the beveled rotational collimator 8 and is therefore unused light. FIG. 2*c* shows the light source 3, a linear collimator 1, a toroidal lens 2, and the part of the cone of light emerging from the light source 3 that was not collimated by the combination of the toroidal lens 2 and the linear collimator 1, and is therefore unused light. The unused portion of light in FIG. 2*c* is substantially less than in FIG. 2*b*; thus, the combination of the linear collimator 1 and the toroidal lens 2 has greater efficiency in the case when the rotational collimator 8 is beveled on both sides and after the beveling has the same thickness as the linear collimator 1. The contribution of the invention is a reduced thickness of the collimator while preserving the efficiency of the optical system, thanks to the inclusion of the toroidal lens 2. The light source emits light into a particular solid angle. The intensity of the light emitted by the light source 3 is given by the radiation characteristic.

Figure 3:
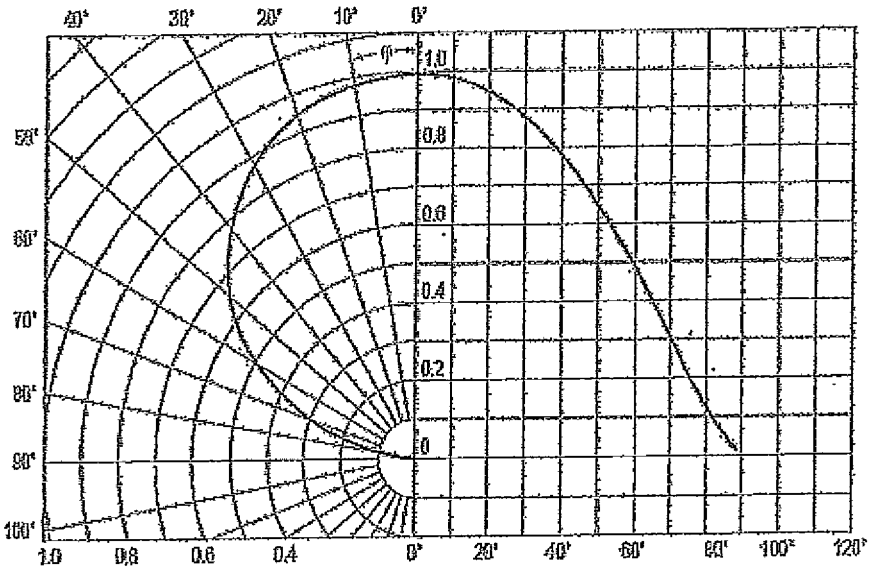
FIG. 3 shows the radiation characteristic of a light-emitting diode (specifically showing a diagram for the light-emitting diode LAE6SF, manufactured by the Osram company).

FIG. 3 shows an example of the broad radiation characteristic of a light-emitting diode identified as LAE6SF from the Osram company. This radiation characteristic of the light source gives the light intensity as a function of the angle made by the imaginary light beam and the axis of the light source. In order to accomplish the aim of the invention, it is desirable to first collimate the light emitted by the light source 3, i.e., the light beams will broaden in the direction of the optical axis of the system or one close to the direction of the optical axis, and then scatter it in the directions required by international regulations for signal functions.

Figure 4:
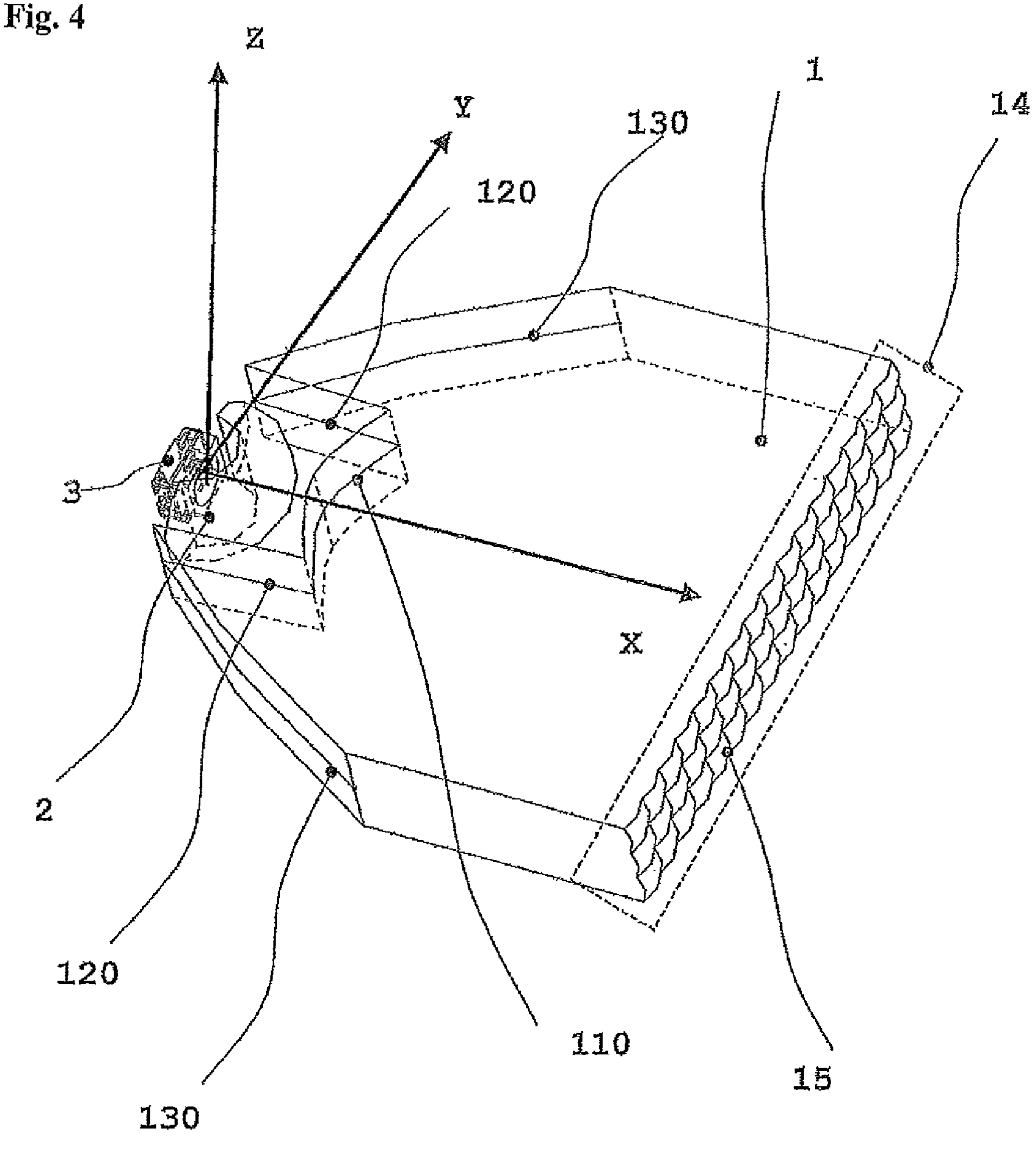
FIG. 4 shows a perspective view of the lightguide module.

FIG. 4 shows a lightguide module consisting of a linear collimator 1, a toroidal lens 2, and a light source 3. The linear collimator 1 is formed by drawing the profile of a collimator composed of curves 110, 120, 130 in the direction perpendicular to a plane formed by the curves 110, 120, 130. The linear collimator 1 is therefore of plate form. At an end of the linear collimator 1 is an exit surface 14, which is formed by scattering elements 15 of a convex or a concave shape.

Figure 5:
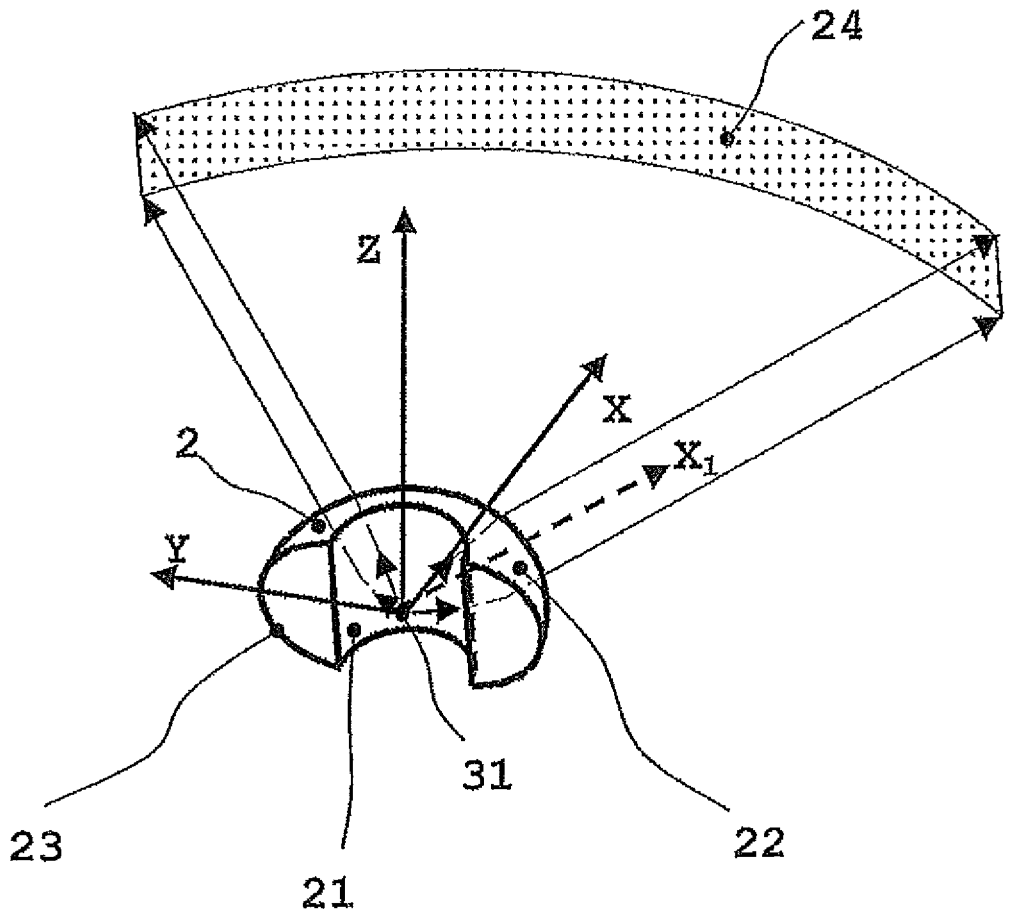
FIG. 5 shows a perspective view of the toroidal lens with light beam in its passage through the toroidal lens.

In FIG. 5, the toroidal lens 2 is formed by the profile of a compound lens 23 rotated about the axis Z, which passes through an optical center 31 of the light source 3. A major portion of the light emitted by the light source 3 enters the toroidal lens 2. The toroidal lens 2 directs the light such that, in any plane $X_1Z$ produced by rotation of the plane XY about the axis Z, the exit light beam after passing through the toroidal lens 2 is parallel with the plane XY or has a slight angular deviation from the plane XY. A surface 24 shows an exit stage of the light beam.

Figure 6:
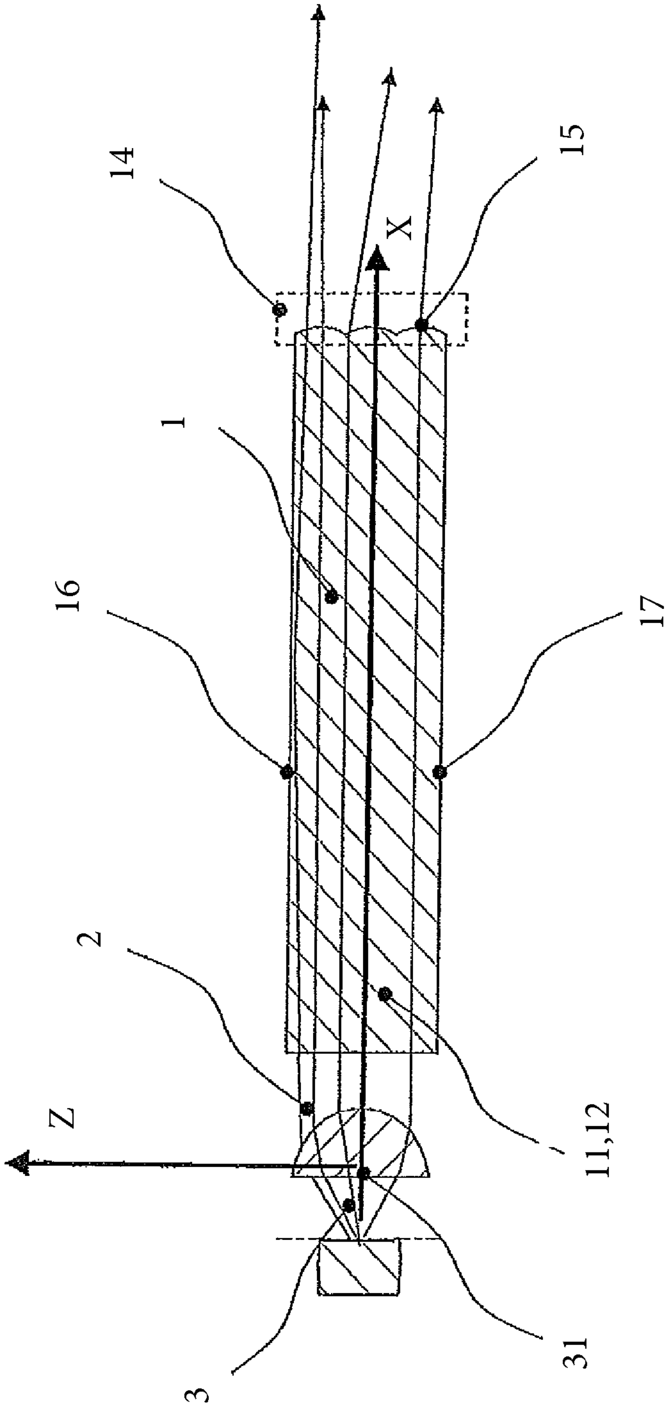
FIG. 6 is a cross section through the lightguide module with luminous edge plane XZ.

In FIG. 6, the light beam collimated by the toroidal lens 2 enters an entry surface 11 of the linear collimator 1. The entry surface 11 is formed by drawing the curve 110 in the direction perpendicular to the plane formed by the curves 110, 120, 130. In the cross section shown in FIG. 6, the entry surface 11 is represented as a curve. After interacting with the entry surface 11, all beams still lie in planes that are parallel with the plane XY, or these planes make only a very slight angle with the plane XY. The light remains inside the collimator on account of satisfying the conditions for total internal reflection on surfaces 16, 17. The light leaves the collimator 1 by the exit surface 14, which contains the scattering elements 15 that scatter the light in the directions required by the international regulations.

Figure 7:
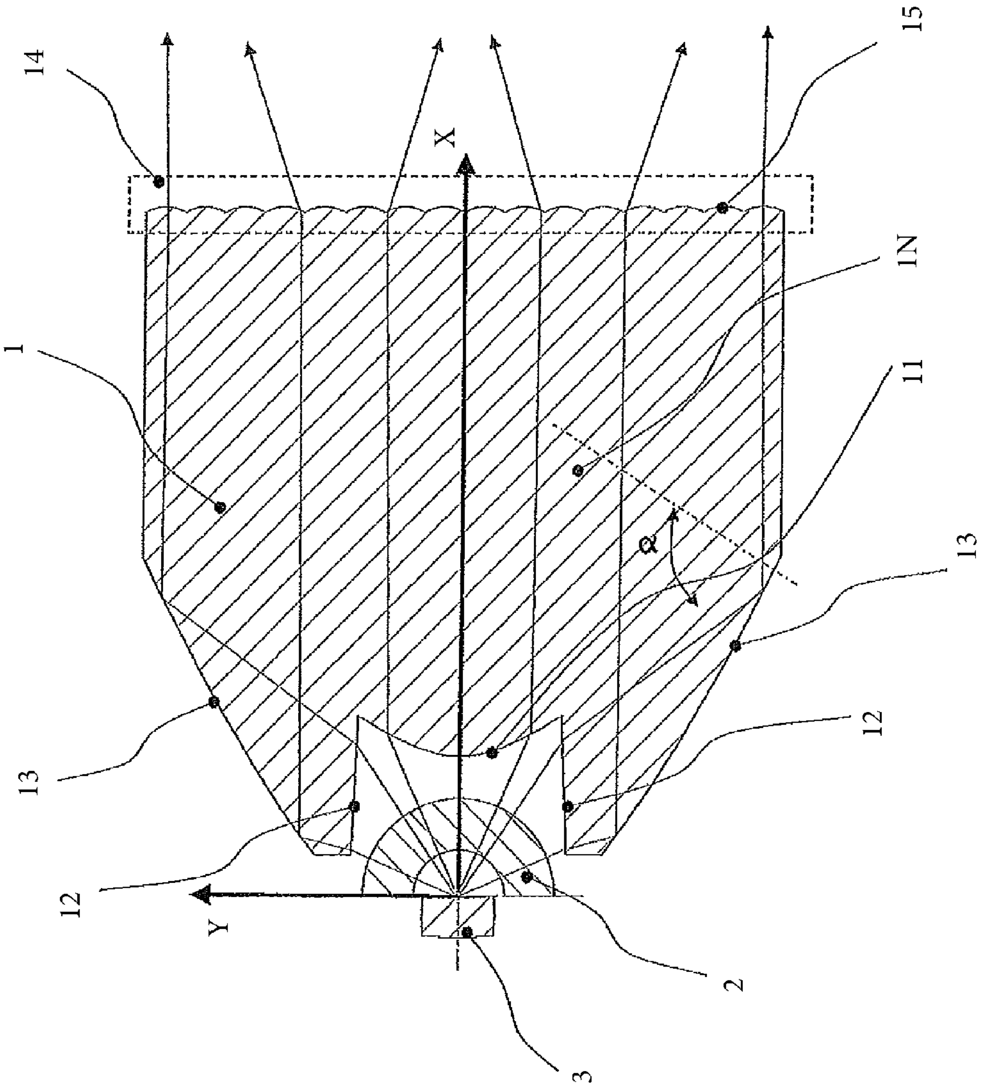
FIG. 7 is a cross section through the lightguide module with luminous edge plane XY.

In the cross section through the lightguide module shown in FIG. 7, the light beam enters the entry surfaces 11, 12 of the linear collimator 1. Surfaces 12 and 13 are formed by drawing the curves 120, 130 in the direction perpendicular to the plane formed by the curves 110, 120, 130. The shape of the surfaces 12, 13 in the plane XY is given by the condition of total reflection of the light beam. It must hold for the surfaces 12, 13 that any light ray that is emitted by the light source 3 and passes through the last surface 12 on which the ray is refracted according to Snell's law must be reflected from the surface 13, in other words the condition for total reflection must be satisfied and the angle α made by the light ray with the normal 1N to the surface 13 must be greater than the limit angle for total reflection. Of course, this can only be fulfilled in the case when the linear collimator 1 is made from material with an index of refraction greater than the index of refraction of the surroundings in which the linear collimator 1 is placed. Since it is a question of signal lights where air is inside them and the linear collimator 1 is made of optically transparent plastic with an index of refraction greater than air, this condition is fulfilled. The light leaves the collimator 1 by the exit surface 14, which contains the scattering elements 15 that scatter the light in the directions required by the international regulations.

Figure 8:
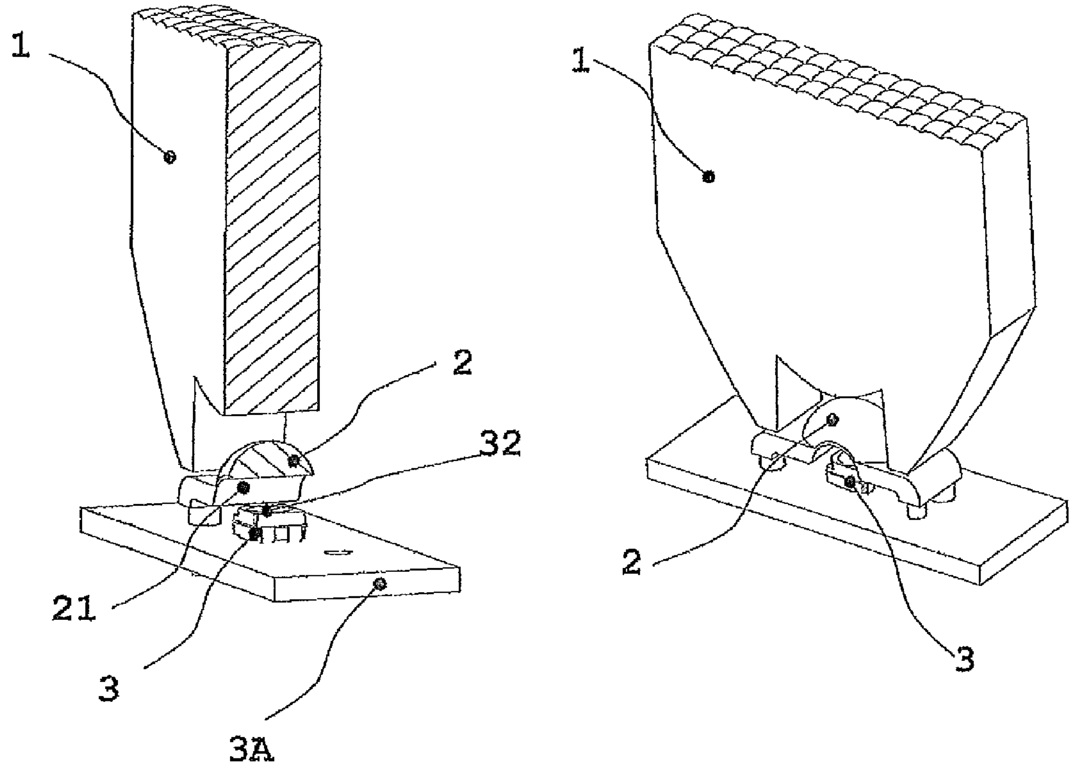
FIG. 8 shows a perspective view and cross section through the lightguide module, where the toroidal lens and the light source are placed on a board with a connected area.

FIG. 8 gives a sample embodiment of the lightguide module where the light source 3 is a light-emitting diode. The light source 3 is placed on a board with connected area 3A. The light-emitting part 32 of the light source 3 is turned toward the entry surface 21 of the toroidal lens 2. The toroidal lens 2 is likewise attached to the board with the connected area 3A. If it is necessary to use several lightguide modules in the function of a signal light, one can connect individual elements of lightguide modules into a single part.

Figure 9:
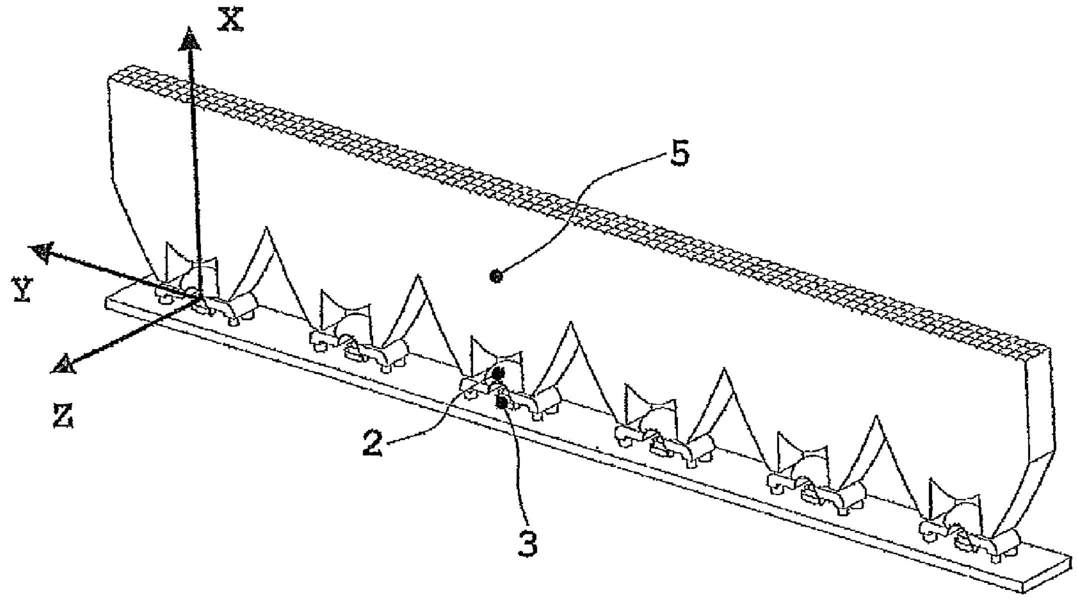
FIG. 9 shows a perspective view of a possible optical system formed by several lightguide modules, where six linear collimators form a single combined part.

FIG. 9 shows an embodiment of a signal light function composed of six lightguide modules, where six linear collimators 1 form a single part 5, and also, the signal light function is formed by six toroidal lenses 2 and six light sources 3. Once again, light-emitting diodes placed on a single board with connected area 3A are used as the light source 3.

Figure 10:
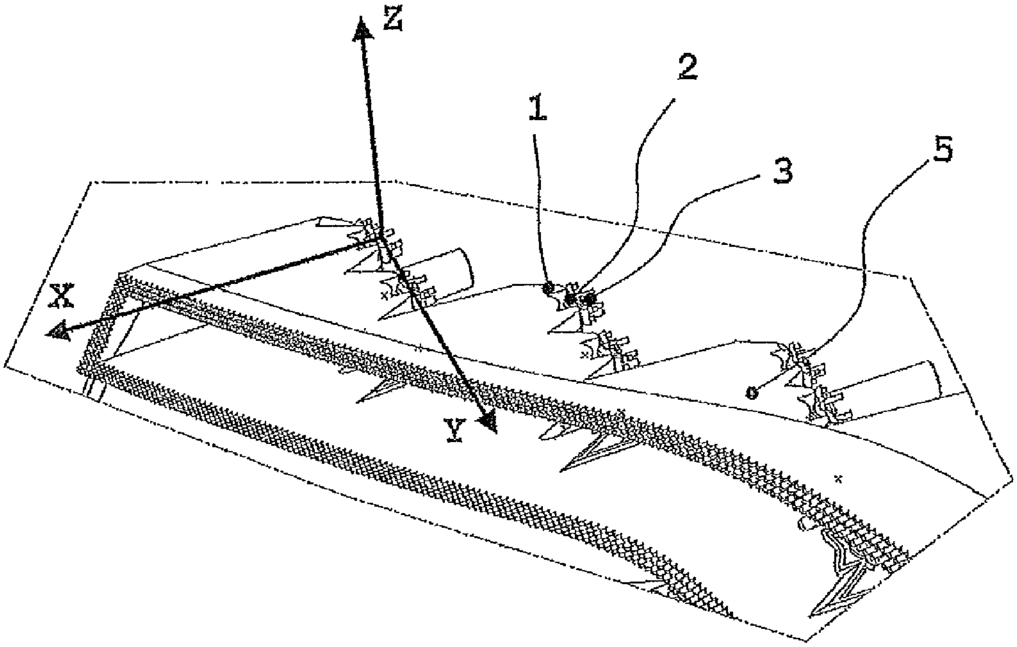
FIG. 10 shows a perspective view of a possible arrangement of part of a signal light making use of several lightguide modules.

FIG. 10 shows an embodiment of a signal light function composed of several lightguide modules. A group of linear collimators 1 is combined into a single part 5. The embodiment further contains a group of toroidal lenses 2 and light sources 3 formed by light-emitting diodes. Unlike the embodiment in FIG. 9, the light-emitting diodes are not placed on a single board with connected area, but on several boards. The single part 5 is three-dimensional, which shows that the invention can be used for signal functions of different shapes.

Figure 11:
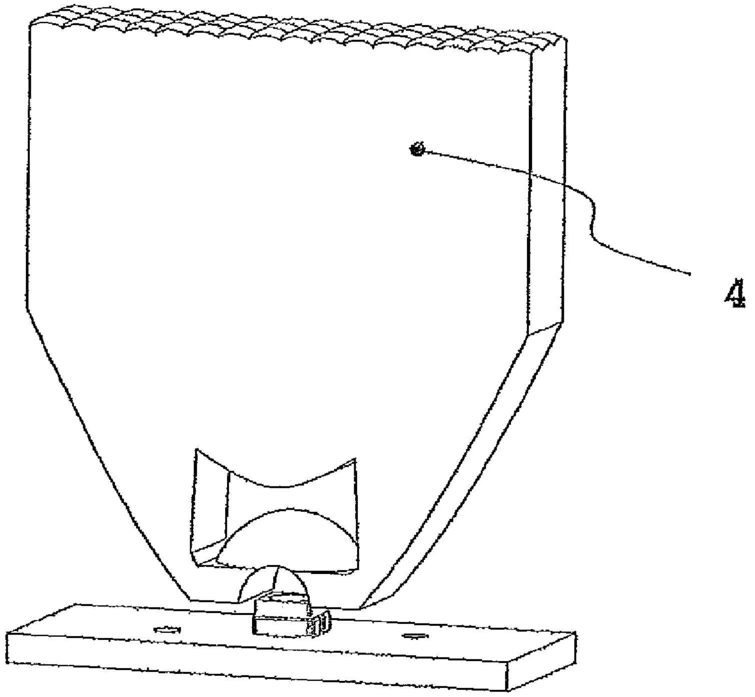
FIG. 11 shows a perspective view of a possible arrangement of the lightguide module, where the linear collimator and the toroidal lens form a single combination part.

FIG. 11 shows an embodiment of the lightguide module. A linear collimator 1 and toroidal lens 2 are joined into a single part 4.

Figure 12:
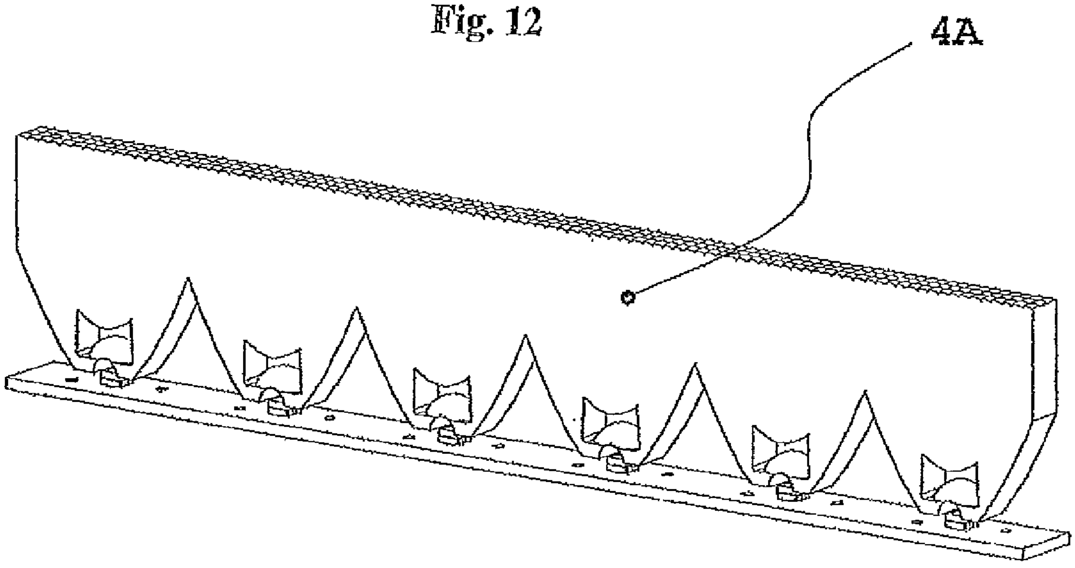
FIG. 12 shows a perspective view of a possible arrangement of part of a signal light formed by several lightguide modules, where six linear collimators and six toroidal lenses form a single combined part.

FIG. 12 shows an embodiment of a signal light function composed of several lightguide modules. A group of linear collimators 1 and toroidal lenses 2 is joined into a single part 4A.

Figure 13:
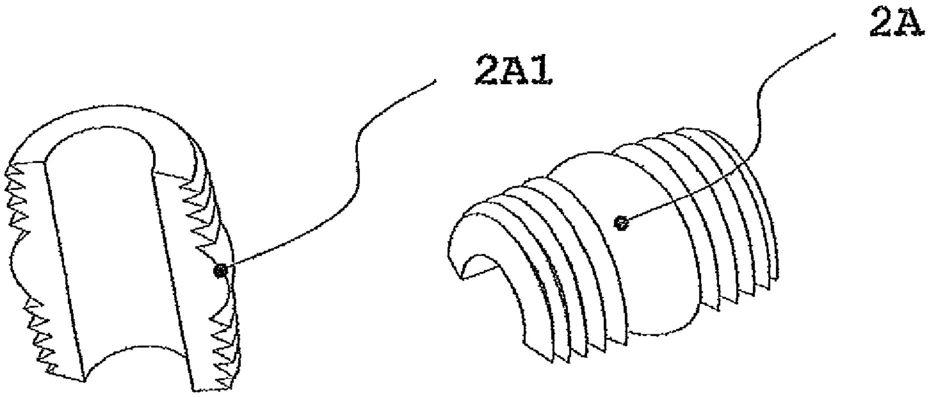
FIG. 13 shows a perspective view of a toroidal lens, where the profile of the toroidal lens is of Fresnel type.

FIG. 13 shows a toroidal lens 2A, where the profile of the toroidal lens 2A is of Fresnel type 2A1.

Figure 14:
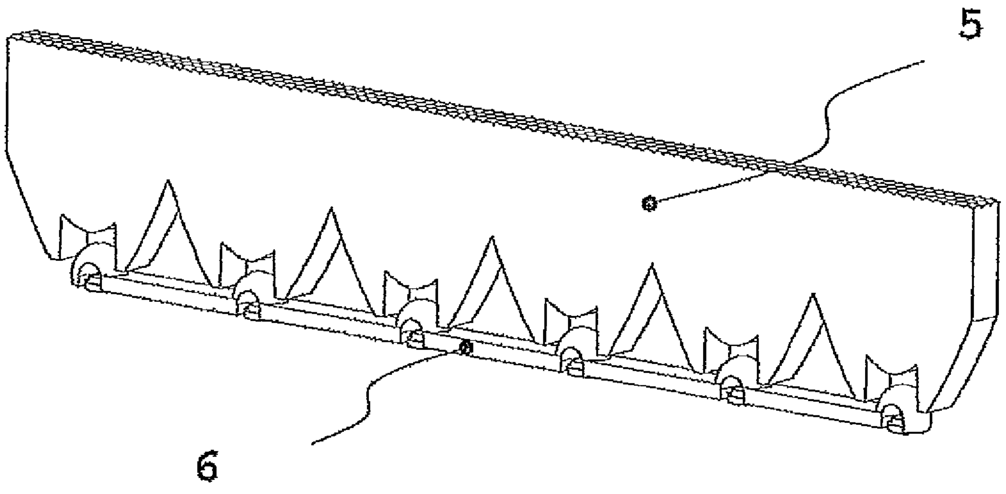
FIG. 14 shows a perspective view of a possible arrangement of part of a signal light formed by several lightguide modules, where six linear collimators form one part and six toroidal lenses form one other part.

FIG. 14 shows an embodiment of a signal light function composed of several lightguide modules. A group of linear collimators 1 is combined into a single part 5. A group of toroidal lenses 2 is combined into a single part 6.

Figure 15:
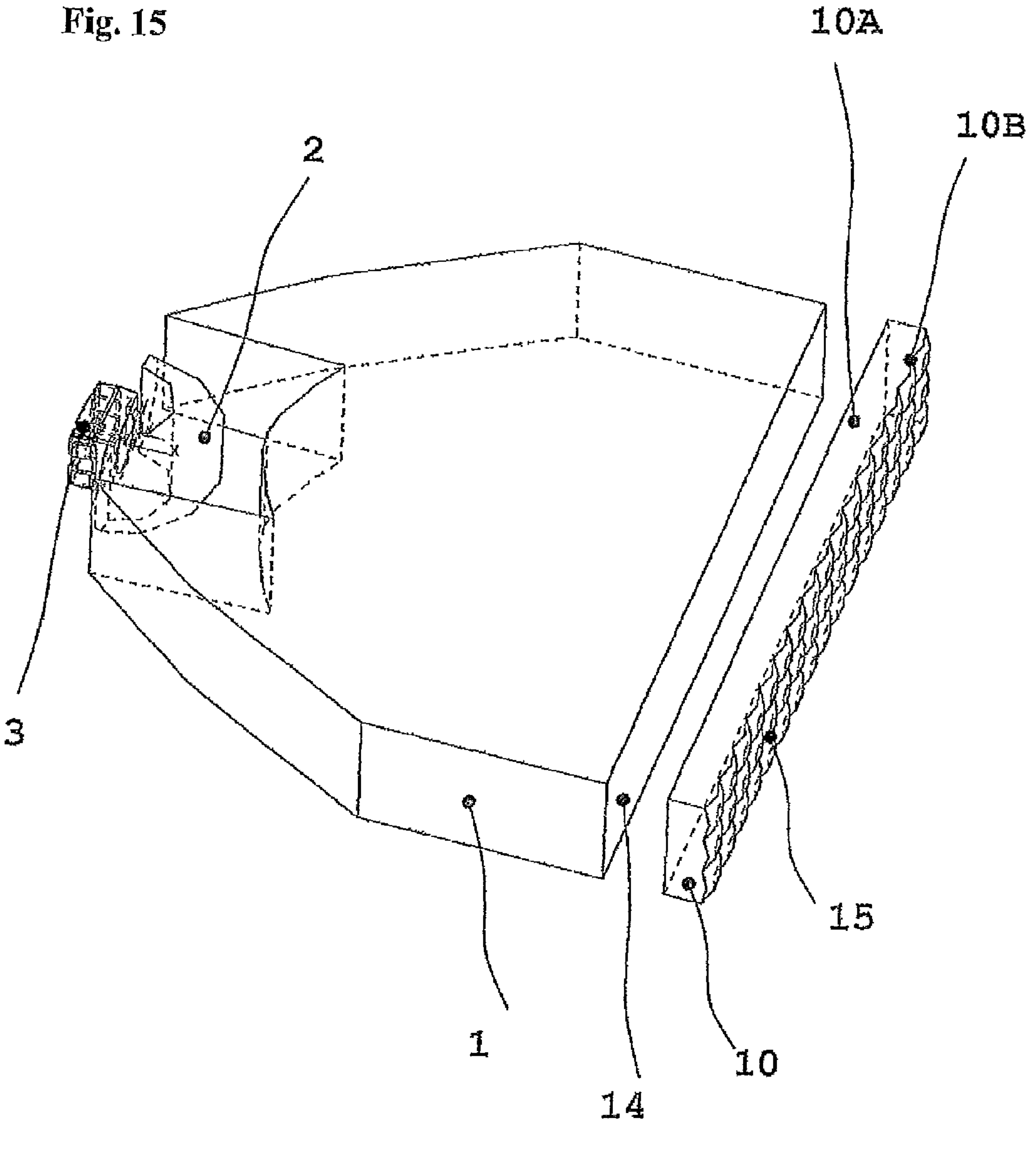
FIG. 15 shows a perspective view of a lightguide module where scattering elements are arranged on an independent part.

FIG. 15 shows a lightguide module composed of a linear collimator 1, a toroidal lens 2, and a light source 3. The exit surface 14 of the linear collimator 1 is formed by a single surface. Scattering elements 15 are placed on an independent part 10.

The lightguide module can be used in transportation engineering for the design and manufacture of signal lights and grouped signal lights of untraditional appearance. The optical system that is the subject of this invention can be used for all signal functions used in rear signal lights and light projectors, i.e., for direction indicators, brake light, tail light, rear projector light, rear fog light, front contour light, daytime light. The lightguide module makes possible the use of light-emitting diodes.

From the foregoing description, one ordinarily skilled in the art can easily ascertain the essential characteristics of this invention and, without departing from the spirit and scope thereof, make various changes and modifications to the invention to adapt it to various usages and conditions.

LIST OF REFERENCE NUMBERS

1—linear collimator
2—toroidal lens
3—light source
4—part formed by the linear collimator (1) and the toroidal lens (2)
4A—part formed by group of linear collimators and toroidal lenses
5—part formed by group of linear collimators (1)
6—part formed by group of toroidal lenses (2)
8—collimator formed as part of a complete rotational collimator
9—complete rotational collimator
10—additional optical plate
11—entry surface of linear collimator
12—entry surface of linear collimator
13—reflecting surface of linear collimator
14—exit surface of linear collimator
15—scattering elements on the exit surface of the linear collimator
16, 17—surfaces of linear collimator
1N—normal to surface (13)
110—profile curve of linear collimator (1)
120—profile curve of linear collimator (1)
130—profile curve of linear collimator (1)
21—entry surface of toroidal lens (2)
22—exit surface of toroidal lens (2)
23—profile of toroidal lens
24—last stage of light beam after passing through toroidal lens
31—optical center of source (3)
32—light-emitting part of the source (3)
81—exit surface of collimator (8)
91—exit surface of complete rotational collimator (9)

What is claimed is:

1. A light guide module, consisting essentially of:

a single light source having an optical center with a light-emitting part for emission of light beams;

a single toroidal lens detached and spaced from the light source having a form created by rotation of a profile of a convex lens about an axis of revolution, the axis of revolution passing through the optical center of the light source and being perpendicular to an optical axis of the light guide module, the toroidal lens having a concave entry surface for entry of the light beams of the light source and a convex exit surface for exit of the light beams in a direction parallel or nearly parallel with a plane perpendicular to the axis of revolution; and a linear collimator being of plate form having in cross section one dimension substantially larger than in another direction perpendicular to it, the linear collimator having an entry surface for entry of the light beams of the toroidal lens and an exit surface for exit of the light beams in a direction of the optical axis of the light guide module, and having outer reflection surfaces being parallel with the plane perpendicular to the axis of revolution for total internal reflection of the light beams nearly parallel with the plane perpendicular to the axis of revolution.

2. A light guide module, consisting essentially of:

a single light source detached and spaced from the light source having an optical center with a light-emitting part for emission of light beams;

a single toroidal lens detached and spaced from the light source having a form created by rotation of a profile of a convex lens about an axis of revolution, the axis of revolution passing through the optical center of the light source and being perpendicular to an optical axis of the light guide module, the toroidal lens having an entry surface for entry of the light beams of the light source and an exit surface for exit of the light beams in a direction parallel or nearly parallel with a plane perpendicular to the axis of revolution; and a linear collimator being of plate form having in cross section one dimension substantially larger than in another direction perpendicular to it, the linear collimator having a concave entry surface for entry of the light beams of the toroidal lens and a convex exit surface for exit of the light beams in a direction of the optical axis of the light guide module, and having outer side reflection surfaces being parallel with the axis of revolution for total internal reflection of the light beams in the direction of the optical axis of the light guide module, whereas the light beams form with a normal of the side reflection surfaces an angle being greater than a limit angle for total internal reflection.

3. A light guide module, consisting essentially of:

a single light source having an optical center with a light-emitting part for emission of light beams;

a single toroidal lens detached and spaced from the light source having a form created by rotation of a profile of a convex lens about an axis of revolution, the axis of revolution passing through the optical center of the light source and being perpendicular to an optical axis of the light guide module, the toroidal lens having a concave entry surface for entry of the light beams of the light source and a convex exit surface for exit of the light beams in a direction parallel or nearly parallel with a plane perpendicular to the axis of revolution; and a linear collimator being of plate form having in cross section one dimension substantially larger than in another direction perpendicular to it, the linear collimator having an entry surface for entry of the light beams of the toroidal lens and an exit surface for exit of the light beams in a direction of the optical axis of the light guide module, and having outer reflection surfaces being parallel with the plane perpendicular to the axis of revolution for total internal reflection of the light beams nearly parallel with the plane perpendicular to the axis of revolution, whereas the toroidal lens and the linear collimator form together a single part.

4. A light guide module, consisting essentially of:

a single light source having a light-emitting part for emission of a light beam;

a single toroidal lens detached and spaced from the light source having a form created by rotation of a profile of a convex lens about an axis of revolution, the axis of revolution passing through the optical center of the light source and being perpendicular to an optical axis of the light guide module, the toroidal lens having a concave entry surface for entry of the light beams of the light source and a convex exit surface for exit of the light beams in a direction parallel or nearly parallel with a plane perpendicular to the axis of revolution; and a linear collimator being of plate form having in cross section one dimension substantially larger than in another direction perpendicular to it, the linear collimator having an entry surface for entry of the light beams of the toroidal lens and an exit surface for exit of the light beams in a direction of the optical axis of the light guide module, and having outer reflection surfaces being parallel with the plane perpendicular to the axis of revolution for total internal reflection of the light beams nearly parallel with the plane perpendicular to the axis of revolution, whereas light scattering elements are arranged on the exit surface of the linear collimator or an additional optical plate disposed adjacent the exit surface of the linear collimator.

5. A light guide module, comprising a single light source having a light-emitting part for emission of a light beam;

a single toroidal lens detached and spaced from the light source having a concave entry surface for entry of the light beam of the light source and a single, continuous convex toroidal exit surface for exit of a light beam directed by the toroidal lens nearly parallel with a horizontal plane; and a linear collimator having an entry surface for entry of the light beam of the toroidal lens and an exit surface for exit of the light beam nearly parallel with the horizontal plane, the linear collimator being of plate form and having outer reflection surfaces for total internal reflection of the light beam nearly parallel with the horizontal plane, the single lens being the only lens.

* * * * *